(12) United States Patent
Xie et al.

(10) Patent No.: US 12,738,836 B2
(45) Date of Patent: Sep. 15, 2026

(54) LOW LOSS SNUBBER CIRCUIT

(71) Applicant: Astec International Limited, Kowloon (HK)

(72) Inventors: Yongtao Xie, Shenzhen (CN); Pengfei Cai, Shenzhen (CN); Mengdie Hu, Shenzhen (CN)

(73) Assignee: AES GLOBAL HOLDINGS PTE. LTD., Singapore (SG)

( * ) Notice: Subject to any disclaimer, the term of this patent is extended or adjusted under 35 U.S.C. 154(b) by 131 days.

(21) Appl. No.: 18/256,536

(22) PCT Filed: Dec. 9, 2020

(86) PCT No.: PCT/CN2020/134905
§ 371 (c)(1),
(2) Date: Jun. 8, 2023

(87) PCT Pub. No.: WO2022/120637
PCT Pub. Date: Jun. 16, 2022

(65) Prior Publication Data

US 2024/0055980 A1 Feb. 15, 2024

(51) Int. Cl.
*H02M 1/34* (2007.01)
*H02M 3/00* (2006.01)
*H02M 3/335* (2006.01)

(52) U.S. Cl.
CPC ............. *H02M 1/346* (2021.05); *H02M 3/01* (2021.05); *H02M 3/33576* (2013.01)

(58) Field of Classification Search
CPC .......... H02M 1/32; H02M 1/34; H02M 1/342; H02M 1/344; H02M 1/346; H02M 1/348;
(Continued)

(56) References Cited

U.S. PATENT DOCUMENTS 5,943,225 A * 8/1999 Park ........................ H02M 1/34
363/126
6,611,410 B1 * 8/2003 Makaran ............... H02J 7/0034
361/84
(Continued)

FOREIGN PATENT DOCUMENTS

CN 202309503 U 7/2012
CN 205051375 U 2/2016
(Continued)

OTHER PUBLICATIONS

Extended European Search Report for EP Patent Application No. 20964580.3, mailed Jul. 17, 2024; 9 pages.
(Continued)

*Primary Examiner* — Thienvu V Tran
*Assistant Examiner* — Carlos O Rivera-Perez

(57) ABSTRACT

A low loss snubber circuit for protecting an electronic device within a power converter is provided. The low loss snubber circuit includes a bidirectional transient voltage suppression (TVS) diode having first and second nodes, wherein the first node of the bidirectional TVS diode is coupled to a first node of the electronic device, and a snubber capacitor having first and second nodes, wherein the first node is coupled to the second node of the bidirectional TVS diode and the second node is coupled to a second node of the electronic device. The low loss snubber circuit further includes a snubber diode having an anode and a cathode, wherein the anode is coupled to the second node of the bidirectional TVS diode and the cathode is coupled to a node of the power converter.

20 Claims, 6 Drawing Sheets

(58) Field of Classification Search

CPC .......... H02M 3/00; H02M 3/01; H02M 3/015; H02M 3/22; H02M 3/24; H02M 3/28; H02M 3/315; H02M 3/335; H02M 3/33507; H02M 3/33515; Y02B 70/10; H03K 17/08; H03K 17/081; H03K 17/08142

USPC ............ 363/15–23, 44–48, 50–58, 125–127; 323/276–278, 908; 361/88–92

See application file for complete search history.

(56) References Cited

U.S. PATENT DOCUMENTS

| | | | | |
|---|---|---|---|---|
| 8,547,711 | B2 * | 10/2013 | Reddy ............... | H02M 3/33592 363/21.02 |
| 2007/0268646 | A1 | 11/2007 | Schermann | |
| 2008/0211552 | A1 | 9/2008 | Lu | |
| 2014/0133200 | A1 | 5/2014 | Sun et al. | |
| 2018/0287486 | A1 * | 10/2018 | Peng ....................... | H02M 1/34 |

FOREIGN PATENT DOCUMENTS

| | | | |
|---|---|---|---|
| CN | 106230246 | A | 12/2016 |
| CN | 108336902 | A | 7/2018 |
| CN | 207977728 | U | 10/2018 |
| CN | 110943618 | A | 3/2020 |
| CN | 211880312 | U | 11/2020 |
| CN | 211957121 | U | 11/2020 |
| EP | 2945269 | A1 | 11/2015 |

OTHER PUBLICATIONS

Zhang Zheyu et al: “High precision gate signal timing control based active voltage balancing scheme for series-connected fast switching field-effect transistors”, IEEE, Mar. 4, 2018, pp. 925-930.

* cited by examiner

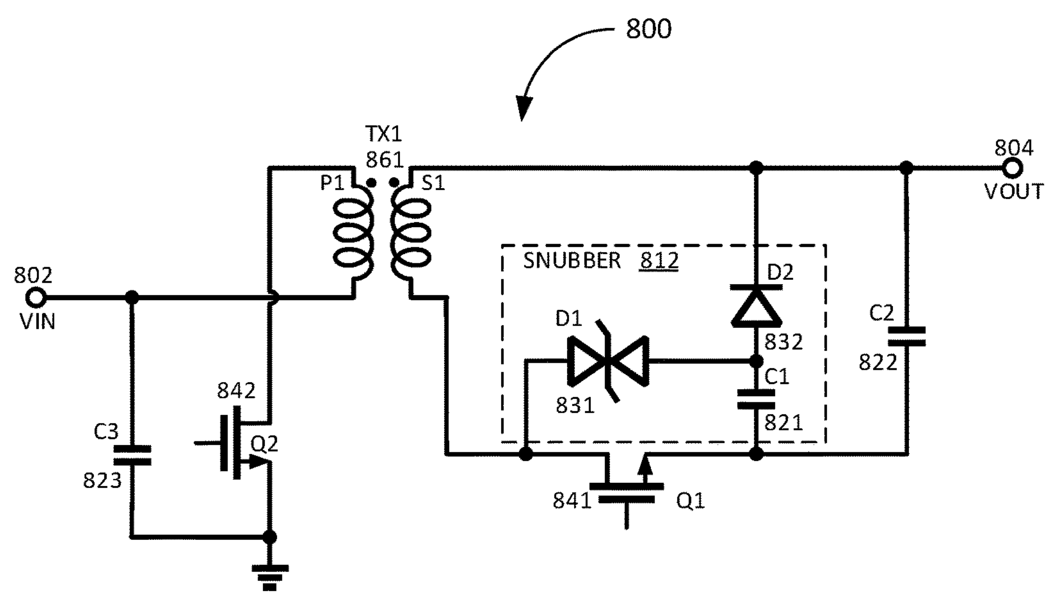
FIGURE 8
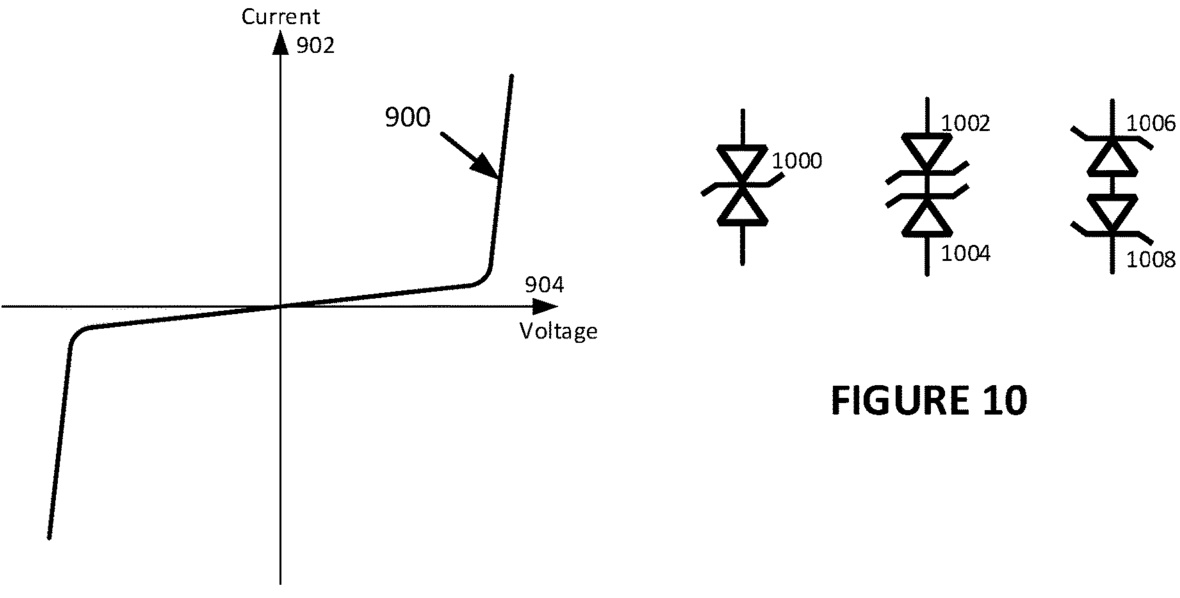
FIGURE 9
FIGURE 10

LOW LOSS SNUBBER CIRCUIT

CROSS-REFERENCE TO RELATED APPLICATION

This application is a National Stage under 35 USC 371 application based off of PCT Application No.: PCT/CN2020/134905, filed 9 Dec. 2020. The entire disclosure of which is incorporated herein by reference.

TECHNICAL FIELD

Aspects of the disclosure are related to electronic components, and in particular to the voltage regulation of power systems, and further in particular to the protection of voltage regulators from power spikes.

TECHNICAL BACKGROUND

DC to DC power converters are often used to provide a stable DC voltage in applications such as telecommunications, data communications, bus converters for servers, and the like. They are required to maintain a stable output voltage over a range of input voltages.

However, power converter switches are susceptible to high voltage spikes. These spikes can exceed the ratings of the switch, destroying the device. Power converters are generally implemented with a snubber circuit configured to clamp any voltage spikes that may appear across their switches.

There are two types of snubbers: passive snubbers that comprise passive electrical components such as capacitors, inductors, and diodes, and active snubbers that comprise passive components and an active semiconductor switch.

It is generally considered that passive snubbers are less expensive, but also less efficient than active snubbers. However, with recent advances in passive snubber technology, regenerative passive snubbers that dissipate little energy have been proposed, and have greater efficiency than traditional passive snubbers. They have become popular due to their lower cost, ease of control, and efficiency.

Existing passive snubbers capable of responding to large dv/dt voltage spikes usually have high power loss on the passive components. Active snubbers may not be effective for large dv/dt voltage spikes since control for the active semiconductor switch in the active snubber may not be fast enough to respond to the voltage spikes in nanoseconds as is necessary to protect the power converter switch.

Overview

In an embodiment, a low loss snubber circuit for protecting an electronic device within a power converter is provided. The low loss snubber circuit includes a bidirectional transient voltage suppression (TVS) diode having first and second nodes, wherein the first node of the bidirectional TVS diode is coupled to a first node of the electronic device, and a snubber capacitor having first and second nodes, wherein the first node is coupled to the second node of the bidirectional TVS diode and the second node is coupled to a second node of the electronic device.

The low loss snubber circuit further includes a snubber diode having an anode and a cathode, wherein the anode is coupled to the second node of the bidirectional TVS diode and the cathode is coupled to a node of the power converter.

In another embodiment, a power converter is provided. The power converter includes an electronic device susceptible to voltage spikes, and a low loss snubber circuit configured to protect the electronic device from voltage spikes.

The low loss snubber circuit includes a bidirectional transient voltage suppression (TVS) diode having first and second nodes, wherein the first node of the bidirectional TVS diode is coupled to a first node of the electronic device, and a snubber capacitor having first and second nodes, wherein the first node is coupled to the second node of the bidirectional TVS diode and the second node is coupled to a second node of the electronic device.

The low loss snubber circuit further includes a snubber diode having an anode and a cathode, wherein the anode is coupled to the second node of the bidirectional TVS diode and the cathode is coupled to a node of the power converter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 8 illustrates an exemplary low loss snubber circuit in a flyback converter.

FIG. 9 illustrates an exemplary current-voltage curve for a bidirectional TVS diode.

FIG. 10 illustrates exemplary bidirectional TVS diodes for use within a low loss snubber circuit.

DETAILED DESCRIPTION

The example embodiments described herein illustrate different methods for providing a low loss passive snubber circuit configured to protect a switch within a power converter. The low loss passive snubber circuit described herein is capable of absorbing large dv/dt voltage spikes in nanoseconds. Also, some portion of the spike energy is regenerated to a voltage output, such that power loss is minimized, and the power converter switch is protected.

Figure 1:
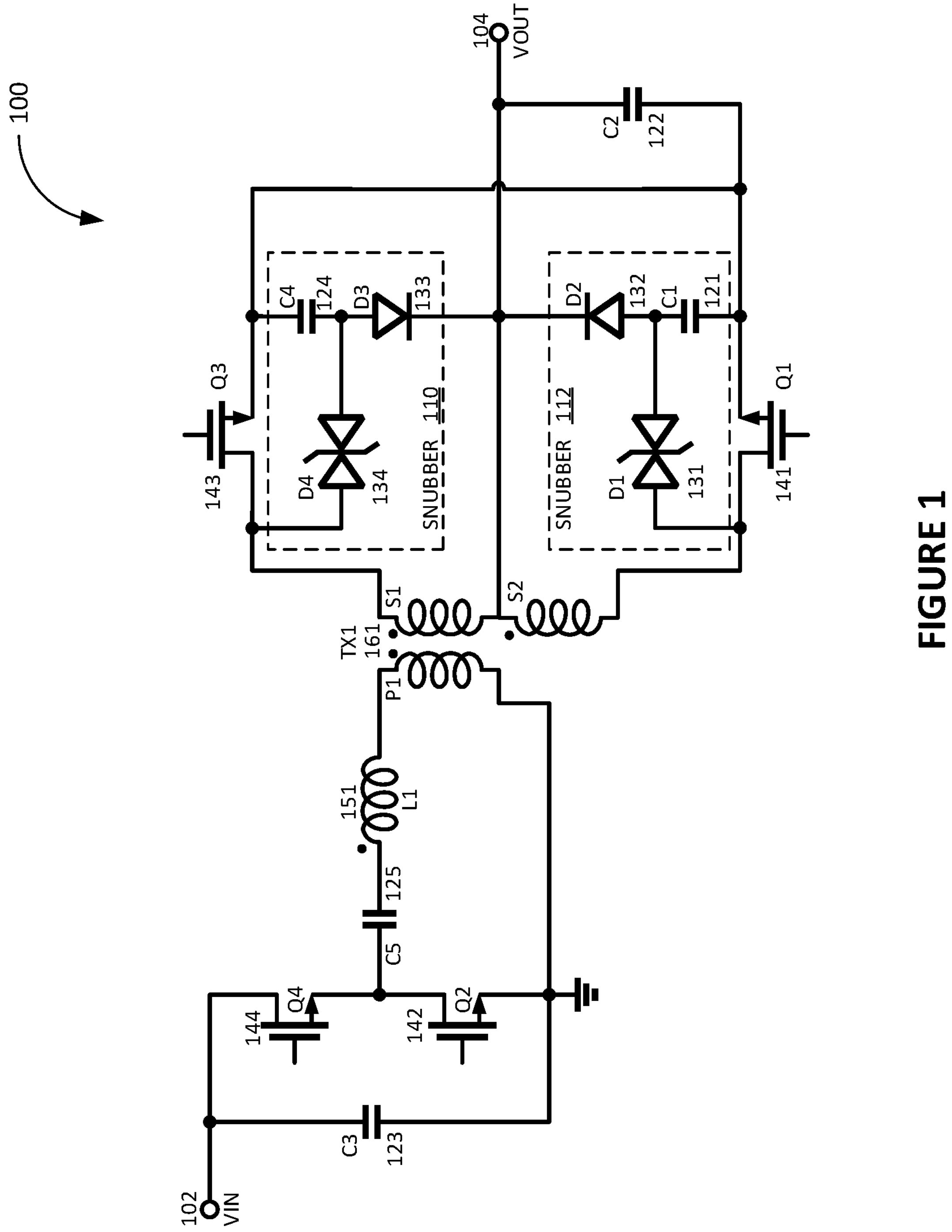
FIG. 1 illustrates an LLC resonant power converter including two low loss snubber circuits.

FIG. 1 illustrates an LLC resonant power converter 100 including two low loss snubber circuits 110 and 112 configured to protect switches Q1 141 and Q3 143. As illustrated in FIG. 1, LLC resonant power converter 100 receives an input voltage VIN at node 102 and provides an output voltage VOUT at node 104. LLC resonant power converter 100 includes input capacitor C3 123, switches Q2 142 and Q4 144, resonant capacitor C5 125, and resonant inductor L1 151 which feeds into transformer TX1 161. Transformer TX1 includes one primary coil and two secondary coils.

Snubber circuit 110 is configured to protect electronic device/switch Q3 143 within LLC resonant power converter 100, while snubber circuit 112 is configured to protect electronic device/switch Q1 141. LLC resonant power converter 100 also includes output filtering capacitor C2 122. While this example embodiment illustrates snubber circuits 110 and 112 in an LLC resonant power converter 100, those of skill in the art will recognize that the low loss snubber circuits of the present invention are equally applicable to protect switches or rectifiers in other power converter configurations including, but not limited to, forward converters, half-bridge converters, full bridge converters, push-pull converters, and flyback converters.

Each low loss snubber circuit includes a bidirectional transient voltage suppression (TVS) diode, a diode, and a capacitor. Snubber 110 includes bidirectional TVS diode D4 134, snubber diode D3 133, and snubber capacitor C4 124, while snubber 112 includes bidirectional TVS diode D1 131, snubber diode D2 132, and snubber capacitor C1 121.

Bidirectional transient voltage suppression (TVS) diodes D1 131 and D4 134 each have first and second nodes. The first node of each bidirectional TVS diode is coupled to a first node of the electronic device.

Snubber capacitors C1 121 and C4 124 each have first and second nodes. The first node of each snubber capacitor is coupled to the second node of one of the bidirectional TVS diode and the second node of each snubber capacitor is coupled to a second node of the electronic device.

Snubber diodes D2 132 and D3 133 each have an anode and a cathode. The anode of each snubber diode is coupled to the second node of the bidirectional TVS diode and the cathode of each snubber diode is coupled to a node of the power converter.

In some embodiments, snubber diodes D2 132 and D3 133 may be ultra-fast recovery diodes, or the like, suitable for snubbering applications. Snubber capacitors C1 121 and C4 124 are preferably high-frequency capacitors, such as ceramic capacitors or film capacitors.

In snubber 112, bidirectional TVS diode D1 131 and snubber capacitor C1 121 form a high-frequency path, and are located close to the device (switch Q1 141) that needs protection. Snubber diode D2 132 is coupled to a circuit node or voltage output (VOUT) where the energy absorbed by the snubber may be regenerated. Snubber 110 performs in the same manner.

During operation of LLC resonant power converter 100, voltage spikes with high dv/dt may appear across switch Q1 141. These spikes may be caused by coupling from a lightning surge, or by the resonance between the output capacitance of switch Q1 141 and the leakage inductance of secondary coil S2 of transformer TX1 161 when switch Q1 141 is turned off.

When large voltage spikes occur on the drain of switch Q1 141, at the leading edge of the spike, once the voltage is greater than the clamping voltage, Vc, of TVS diode D1 131 plus the residual voltage, Vcr, of capacitor C1 121, bidirectional TVS diode D1 131 responds within picoseconds to clamp the voltage. The voltage spike is clamped by bidirectional TVS diode D1 131 and charges capacitor C1 121.

As capacitor C1 121 is charged, voltage across capacitor C1 121 increases. Once it reaches a voltage Vcf that forward biases diode D2 132, the energy of the spike is regenerated to VOUT 104 through bidirectional TVS diode D1 131 and diode D2 132, and acts to charge output filter capacitor C2 122. Only a small portion of the energy of the spike is dissipated in bidirectional TVS diode D1 131. This effectively clamps the voltage spike to a level equal to the voltage output (VOUT) plus the clamping voltage, Vc, of bidirectional TVS diode D1 131 and the diode drop of diode D2 132.

Since TVS diode D1 131 is bidirectional, only a small portion of the energy stored in the snubber capacitor C1 121 will be discharged when switch Q1 141 is on. The residual voltage, Vcr, on the snubber capacitor depends on either the voltage clamping rating of bidirectional TVS diode D1 131 or the voltage output node VOUT where the cathode of snubber diode D2 132 is coupled. In some example embodiments of the present invention, the cathode of snubber diode D2 132 may be coupled to other voltage sources, such as an internal bias node, such that the low loss snubber circuit is configured to regenerate energy from a voltage spike to an internal bias node.

In some example embodiments of the present invention, large snubber capacitors C1 121 may be used to effectively clamp large dv/dt voltage spikes without increasing the switch loss by including bidirectional TVS diode D1 131. Thus, it operates similar to an active clamp circuit as snubber capacitor C1 121 does not completely discharge.

As discussed above, embodiments of the present invention regenerate some of the energy of the voltage spike. This reduces power loss of the snubber circuit and improves the efficiency of the power converter.

Since snubber capacitor C1 121 does not completely discharge, it allows the use of much a lower clamping voltage rated bidirectional TVS diode D1 131, as long as its standoff voltage is larger than the winding voltage of secondary coil S2 of transformer TX1 161. This reduces the power dissipation on bidirectional TVS diode D1 131 and increases the robustness of bidirectional TVS diode D1 131, since a lower clamping voltage allows for higher clamping currents for a given power rating of the bidirectional TVS diode D1 131. Example embodiments of the present invention may be used both in hard-switching switches and in resonant converters.

Switching cycle snubbering is possible as the response of snubbers 110 and 112 are very fast. However, in example embodiments it is preferred that bidirectional TVS diode D1 131 is selected such that it only starts to respond and clamp at the moment when switch Q1 141 is exceeding its derating target. In this manner, power loss is further reduced as it may not need to respond every switching cycle.

In one example embodiment of the present invention, the breakdown voltage rating of switch Q1 141 is 250V. With a voltage spike having a dv/dt exceeding 50V/ns the voltage spike is clamped to about 226V, which is about 90% of the rating of switch Q1 141, protecting the rectifier and improving the robustness of the circuit.

Multiple designs of snubber circuits presently exist, however, many of them have shortcomings that are reduced or eliminated by the low loss snubber circuit described herein. For example, some snubbers use a parallel capacitor to increase output capacitance of the switch in order to slow down the slope of the voltage spike. However, this approach increases power loss within the switch.

Other snubbers use a bidirectional TVS diode in parallel with the switch. However, this approach results in high power loss from the bidirectional TVS diode during clamping, and the clamping voltage of the bidirectional TVS diode must be higher than the working voltage of the switch but less than the breakdown voltage of the switch.

Active snubbers are expensive and they may not be effective for large dv/dt voltage spikes because control for the active semiconductor switch in the active snubber may not be fast enough to respond to the voltage spike in nanoseconds as is necessary to protect the switch.

Several of these prior art snubbers are illustrated in FIGS. 2-6 and described in detail below.

Figure 2:
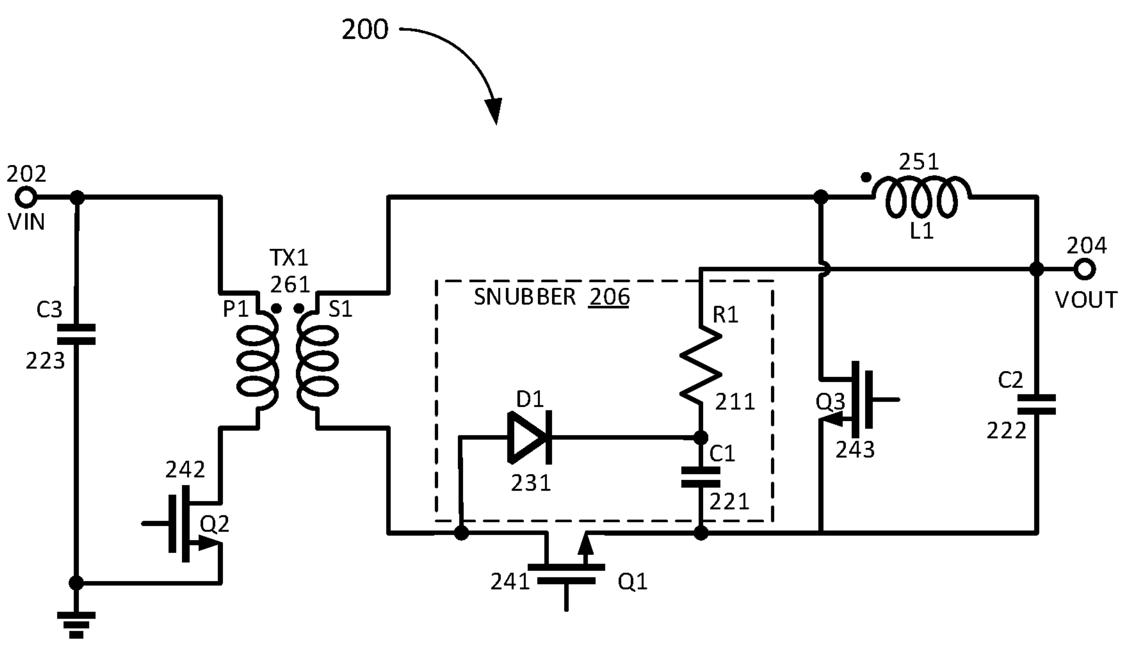
FIG. 2 illustrates an exemplary prior art resistor-capacitor-diode (RCD) snubber.

FIG. 2 illustrates an exemplary prior art resistor-capacitor-diode (RCD) snubber 206. In this example embodiment, power converter 200 receives an input voltage VIN at node 202 and provides an output voltage VOUT at node 204. Power converter 200 includes input capacitor C3 223, switch Q2 242, transformer TX1 261, switches Q1 241 and Q3 243, inductor L1 251 and output filter capacitor C2 222.

RCD snubber 206 is configured to protect switch Q1 241. In this prior art example, RCD snubber 206 comprises diode D1 231, capacitor C1 221, and resistor R1 211. When a voltage spike appears on the drain of Q1 241, and rises to a voltage such that D1 231 is forward biased, the voltage spike is absorbed by snubber capacitor C1 221 through snubber diode D1 231.

The response time of this RCD snubber 206 is dependent on snubber diode D1 231. Ultra-fast diodes are commonly used for snubber diode D1 231, with response times in the dozens of nanoseconds. Thus, this RCD snubber 206 is not capable of effectively responding to large dv/dt voltage spikes in nanoseconds as may be necessary to protect switch Q1 241.

The energy stored in the snubber capacitor C1 221 is discharged to VOUT 204 through resistor R1 211. This results in large power dissipation from resistor R1 211. Also, the time constant of the snubber capacitor C1 221 and snubber resistor R1 211 is usually much larger than the switching period of the voltage converter. Thus, this snubber is less effective for snubbering switching cycle voltage spikes.

Figure 3:
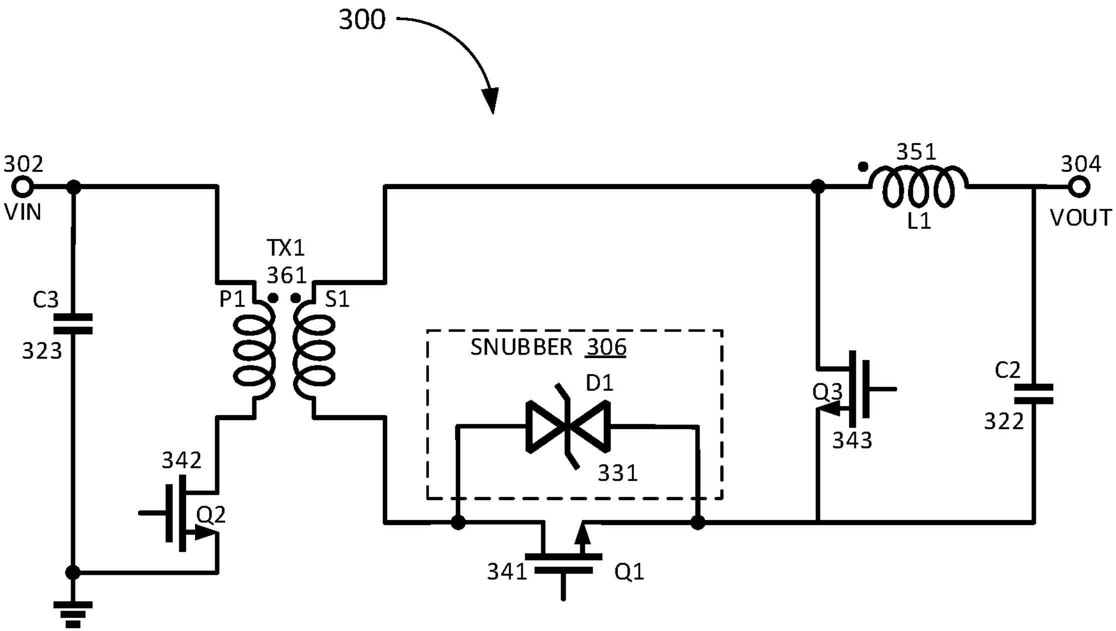
FIG. 3 illustrates an exemplary prior art parallel bidirectional TVS diode snubber.

FIG. 3 illustrates an exemplary prior art parallel bidirectional TVS diode snubber 306. In this example embodiment, power converter 300 receives an input voltage VIN at node 302 and provides an output voltage VOUT at node 304. Power converter 300 includes input capacitor C3 323, switch Q2 342, transformer TX1 361, switches Q1 341 and Q3 343, inductor L1 351 and output filter capacitor C2 322.

Snubber 306 is configured to protect switch Q1 341. In this prior art example, snubber 306 comprises bidirectional TVS diode D1 331 connected in parallel with switch Q1 341.

In this prior art example snubber, bidirectional TVS diode D1 331 clamps the voltage across switch Q1 341. The energy of the voltage spike is dissipated from bidirectional TVS diode D1 331, and use of this snubber for cycle-by-cycle snubbering may result in high power dissipation and a hot spot on bidirectional TVS diode D1 331.

Also, because of the current-voltage characteristics of bidirectional TVS diode D1 331, the clamping voltage is higher for a higher amplitude voltage spike. The clamping voltage of the bidirectional TVS diode must be higher than the working voltage of the switch but less than the breakdown voltage of the switch. Thus, it may be difficult to select a bidirectional TVS diode D1 331 with a proper clamping voltage to balance power dissipation and protection of switch Q1 341. Because of these characteristics of this snubber, higher stress may be present on switch Q1 341 than is desirable.

Figure 4:
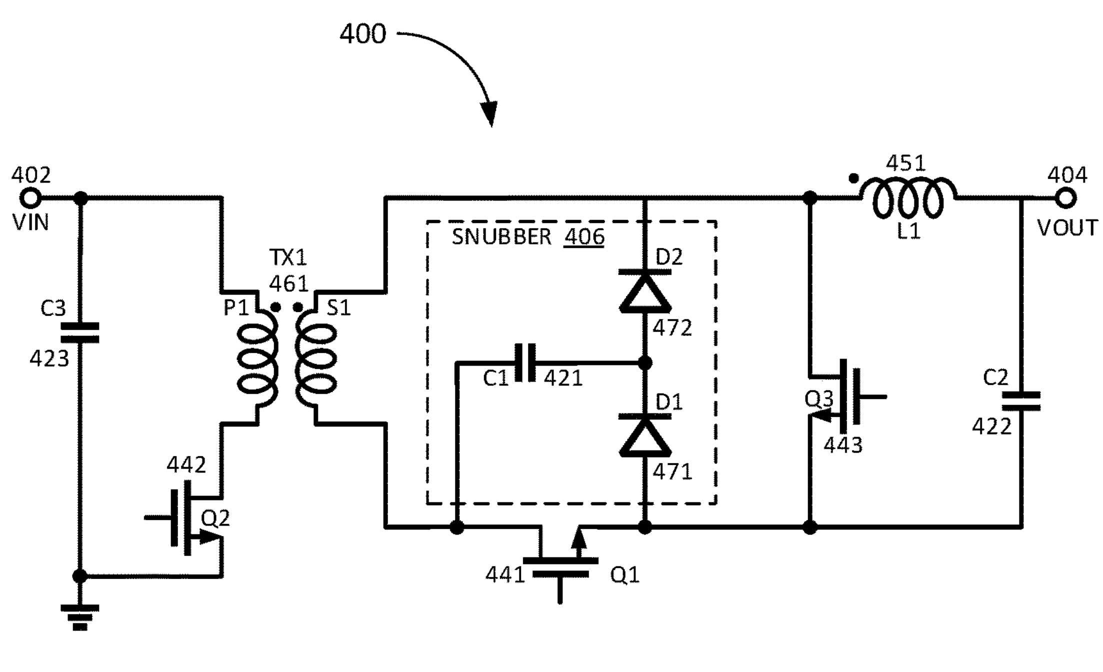
FIG. 4 illustrates an exemplary prior art capacitor-diode-diode (CDD) snubber.

FIG. 4 illustrates an exemplary prior art capacitor-diode-diode (CDD) snubber 406. In this example embodiment, power converter 400 receives an input voltage VIN at node 402 and provides an output voltage VOUT at node 404. Power converter 400 includes input capacitor C3 423, switch Q2 442, transformer TX1 461, switches Q1 441 and Q3 443, inductor L1 451 and output filter capacitor C2 422.

CDD snubber 406 is configured to protect switch Q1 441. In this prior art example, CDD snubber 406 comprises snubber capacitor C1 421 and snubber diodes D1 471 and D2 472.

In this prior art example, when a voltage spike appears at the drain of Q1 441, the spike is absorbed by snubber capacitor C1 421 when the voltage reaches a level sufficient to forward bias snubber diode D2 472. Part of the energy of the spike may be regenerated to VOUT 404 through capacitor C1 421, diode D2 472, and inductor L1 451. Part of the energy of the spike may circulate back to secondary coil S1 of transformer TX1 461 through capacitor C1 421 and diode D2 472. When switch Q1 441 is on, the energy stored in snubber capacitor C1 421 is discharged and dissipated through switch Q1 441 and snubber diode D1 471.

The response time of this type of snubber circuit depends on snubber diode D2 472. Ultra-fast diodes are commonly used for snubber diode D2 472, with response times in the dozens of nanoseconds. Thus, this CDD snubber 406 is not capable of effectively responding to large dv/dt voltage spikes in nanoseconds as may be necessary to protect switch Q1 441.

When switch Q1 441 is turned on, snubber capacitor C1 421 is completely drained. Thus, capacitor C1 421 must be properly selected in order to avoid increasing the switching loss of switch Q1 441. If the capacitance of snubber capacitor C1 421 is too small, it will quickly be charged to a level that exceeds the drain-source breakdown voltage of switch Q1 441. However, if the capacitance of snubber capacitor C1 421 is too large, power dissipation will be high when switch Q1 441 is on.

Figure 5:
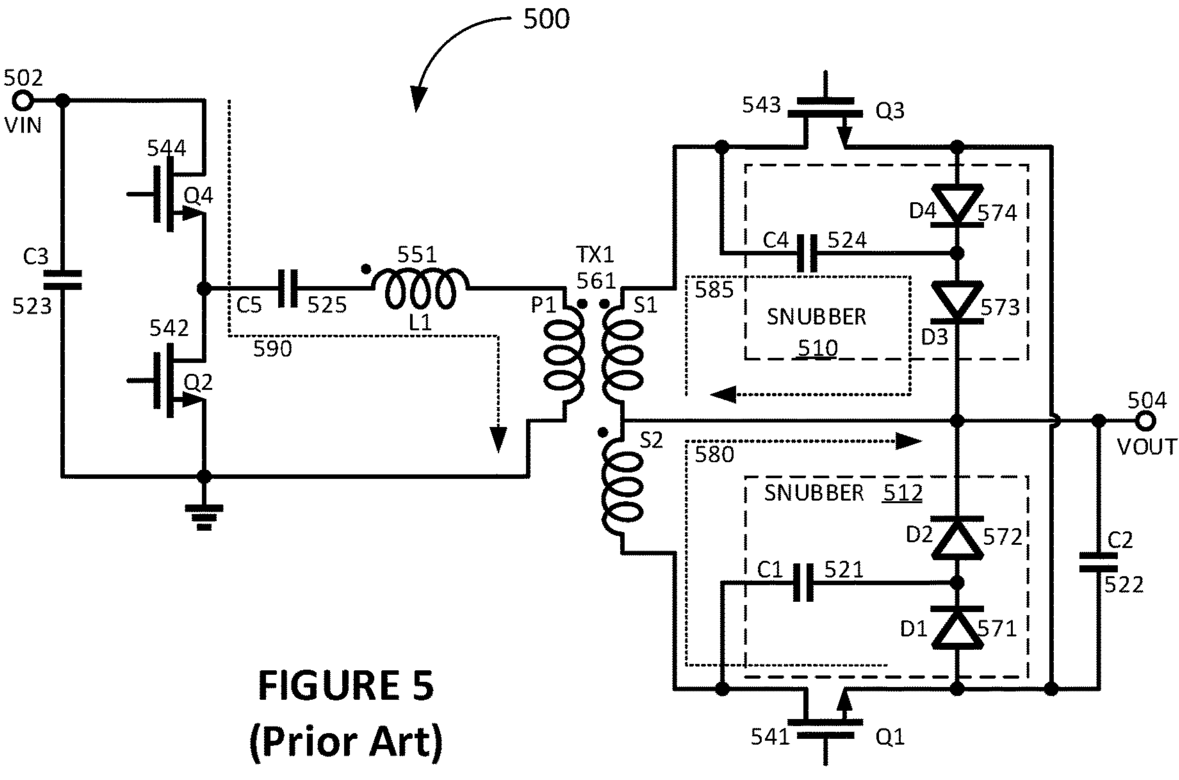
FIG. 5 illustrates the exemplary prior art capacitor-diode-diode (CDD) snubber of FIG. 4 used in an LLC resonant power converter.

FIG. 5 illustrates the exemplary prior art capacitor-diode-diode (CDD) snubber 406 of FIG. 4 used in an LLC resonant power converter 500. In this example embodiment, LLC resonant power converter 500 receives an input voltage VIN at node 502 and provides an output voltage VOUT at node 504. LLC resonant power converter 500 includes input capacitor C3 523, switches Q2 542 and Q4 544, resonant capacitor C5 525, resonant inductor L1 551, transformer TX1 561, switches Q1 541 and Q3 543, and output filter capacitor C2 522. Transformer TX1 561 includes primary coil P1 and secondary coils S1 and S2.

CDD snubber 510 is configured to protect switch Q3 543, while CDD snubber 512 is configured to protect switch Q1 541. CDD snubber 510 includes snubber capacitor C4 524 and snubber diodes D3 573 and D4 574, while CDD snubber 512 includes snubber capacitor C1 521 and snubber diodes D1 571 and D2 572.

This prior art example illustrates the fact that the CDD snubber 406 of FIG. 4 is not suitable for use in resonant converters such as the LLC resonant power converter 500 illustrated here. Here, during charging of snubber capacitors C1 521 or C4 524, the snubber capacitor is equivalently coupled to the transformer winding. Thus, the snubber capacitor becomes part of the resonant element and changes the resonant characteristics of the LLC resonant power converter 500.

When switch Q1 541 is rectifying, current flows through switch Q1 541 and secondary coil S2 of transformer TX1 561 to output VOUT 504, (path 580). When switch Q1 541 is on, switch Q3 543 on the other rail is off. When switch Q3 543 is off, snubber capacitor C4 524 is equivalently coupled to secondary winding S1 of transformer TX1 561 (path 585). It will be reflected to the primary resonant tank (path 590)

including resonant capacitor C5 525, resonant inductor L1 551, and primary coil P1 of transformer TX1 561.

Because of this effect on the primary tank circuit, this CDD type of snubber circuit is not suitable for synchronous rectifier resonant power converters such as LLC resonant power converter 500.

Figures 6, 7:
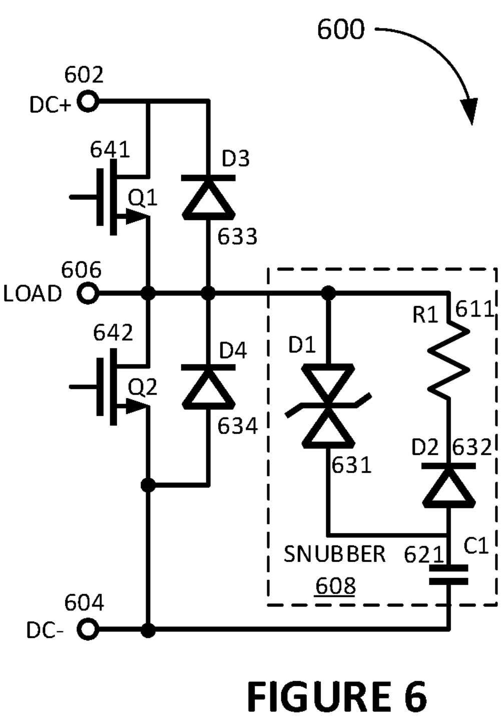
FIG. 6 illustrates an exemplary prior art snubber for use with an insulated gate bipolar transistor (IGBT) inverter circuit.
FIG. 7 illustrates an exemplary low loss snubber circuit in a forward converter.

FIG. 6 illustrates an exemplary prior art snubber 608 for use with an insulated gate bipolar transistor (IGBT) inverter circuit 600. In this prior art example, an IGBT inverter includes transistors Q1 641 and Q2 642 and diodes D3 633 and D4 634. The IGBT inverter circuit 600 receives input voltages DC+ 602 and DC− 604 and provides power to LOAD 606. In this example, snubber 608 is configured to protect transistor Q2 642.

Snubber 608 comprises bidirectional TVS diode D1 631, snubber capacitor C1 621, snubber diode D2 632, and snubber resistor R1 611. When there is a voltage spike on transistor Q2 642, bidirectional TVS diode D1 631 is activated and snubber capacitor C1 621 is charged. When transistor Q2 642 is on, snubber capacitor C1 621 is discharged through snubber diode D2 632 and snubber resistor R1 611.

In this circuit no voltage spike energy is reused, and there is high power dissipation on snubber resistor R1 611. The discharge speed of snubber 608 is dependent on the time constant of snubber resistor R1 611 and snubber capacitor C1 621.

FIG. 7 illustrates an exemplary low loss snubber 712 circuit in a forward converter 700. As illustrated in FIG. 7, forward converter 700 receives an input voltage VIN at node 702 and provides an output voltage VOUT at node 704. Forward converter 700 includes input capacitor C3 723, switches Q1 741, Q2 742, and Q3 743, transformer TX1 761, inductor L1 751 and output filtering capacitor C2 722.

Snubber circuit 712 is configured to protect switch Q1 741. Low loss snubber circuit 712 includes a bidirectional transient voltage suppression (TVS) diode D1 731, a snubber diode D2 732, and a snubber capacitor C1 721.

Functionally, snubber circuit 712 operates similar to snubber circuits 110 and 112 of FIG. 1. In some embodiments, snubber diode D2 732 may be an ultra-fast recovery diode, or the like, suitable for snubbering applications. Capacitor C1 721 is preferably a high-frequency capacitor, such as a ceramic capacitor or film capacitor.

In snubber 712, bidirectional TVS diode D1 731 and capacitor C1 721 form a high-frequency path, and are located close to the device (switch Q1 741) that needs protection. Diode D2 732 is coupled to a circuit node or voltage output (VOUT) where the energy absorbed by the snubber may be regenerated.

During operation of forward converter 700, voltage spikes with high dv/dt may appear across switch Q1 741. These spikes may be caused by coupling from a lightning surge, or by the resonance between the output capacitance of switch Q1 741 and the leakage inductance of secondary coil S1 of transformer TX1 761 when switch Q1 741 is turned off.

When large voltage spikes occur on the drain of switch Q1 741, at the leading edge of the spike, once the voltage is greater than the clamping voltage, Vc, of TVS diode D1 731 plus the residual voltage, Vcr, of capacitor C1 721, bidirectional TVS diode D1 731 responds within picoseconds to clamp the voltage. The voltage spike is clamped by bidirectional TVS diode D1 731 and charges capacitor C1 721.

As capacitor C1 721 is charged, voltage across capacitor C1 721 increases. Once it reaches a voltage Vcf that forward biases diode D2 732, the energy of the spike is regenerated to VOUT 704 through bidirectional TVS diode D1 731 and Diode D2 732, and acts to charge output filter capacitor C2 722. Only a small portion of the energy of the spike is dissipated in bidirectional TVS diode D1 731. This effectively clamps the voltage spike to a level equal to the voltage output (VOUT) plus the clamping voltage, Vc, of bidirectional TVS diode D1 731 and the diode drop of diode D2 732.

Since TVS diode D1 731 is bidirectional, only a small portion of the energy stored in the snubber capacitor C1 721 will be discharged when switch Q1 731 is on. The residual voltage, Vcr, on the snubber capacitor depends on either the voltage clamping rating of bidirectional TVS diode D1 731 or the voltage output node VOUT where the cathode of snubber diode D2 732 is coupled. In some example embodiments of the present invention, the cathode of snubber diode D2 732 may be coupled to other voltage sources, such as an internal bias node, such that the low loss snubber circuit is configured to regenerate energy from a voltage spike to an internal bias node.

In some example embodiments of the present invention, large snubber capacitors C1 721 may be used to effectively clamp large dv/dt voltage spikes without increasing the switch loss of Q1 741 by including bidirectional TVS diode D1 731. Thus, it operates similar to an active clamp circuit as snubber capacitor C1 721 does not completely discharge.

As discussed above, embodiments of the present invention regenerate some of the energy of the voltage spike. This reduces power loss of the snubber circuit and improves the efficiency of the power converter.

Since snubbing capacitor C1 721 does not completely discharge, it allows the use of much a lower clamping voltage rated bidirectional TVS diode D1 731, as long as its standoff voltage is larger than the winding voltage of secondary coil S1 of transformer TX1 761. This reduces the power dissipation on bidirectional TVS diode D1 731 and increases the robustness of bidirectional TVS diode D1 731, since a lower clamping voltage allows for higher clamping currents for a given power rating of the bidirectional TVS diode D1 731. Example embodiments of the present invention may be used both in hard-switching switches and in resonant converters.

Switching cycle snubbering is possible as the response of snubber 712 is very fast. However, in example embodiments it is preferred that bidirectional TVS diode D1 731 is selected such that it only starts to respond and clamp at the moment when switch Q1 741 is exceeding its derating target. In this manner, power loss is further reduced as it may not need to respond every switching cycle.

FIG. 8 illustrates an exemplary low loss snubber circuit in a flyback converter. As illustrated in FIG. 8, flyback converter 800 receives an input voltage VIN at node 802 and provides an output voltage VOUT at node 804. Flyback converter 800 includes input capacitor C3 823, switches Q1 841 and Q2 842, transformer TX1 861, and output filtering capacitor C2 822.

Snubber circuit 812 is configured to protect switch Q1 841. Low loss snubber circuit 812 includes a bidirectional transient voltage suppression (TVS) diode D1 831, a snubber diode D2 832, and a snubber capacitor C1 821.

Functionally, snubber circuit 812 operates similar to snubber circuits 110 and 112 of FIG. 1. In some embodiments, snubber diode D2 832 may be an ultra-fast recovery diode, or the like, suitable for snubbering applications. Capacitor C1 821 is preferably a high-frequency capacitor, such as a ceramic capacitor or film capacitor.

In snubber 812, bidirectional TVS diode D1 831 and capacitor C1 821 form a high-frequency path, and are located close to the device (switch Q1 841) that needs protection. Diode D2 832 is coupled to a circuit node or voltage output (VOUT) where the energy absorbed by the snubber may be regenerated.

During operation of flyback converter 800, voltage spikes with high dv/dt may appear across switch Q1 841. These spikes may be caused by coupling from a lightning surge, or by the resonance between the output capacitance of switch Q1 841 and the leakage inductance of secondary coil S1 of transformer TX1 861 when switch Q1 841 is turned off.

When large voltage spikes occur on the drain of switch Q1 841, at the leading edge of the spike, once the voltage is greater than the clamping voltage, Vc, of TVS diode D1 831 plus the residual voltage, Vcr, of capacitor C1 821, bidirectional TVS diode D1 831 responds within picoseconds to clamp the voltage. The voltage spike is clamped by bidirectional TVS diode D1 831 and charges capacitor C1 821.

As capacitor C1 821 is charged, voltage across capacitor C1 821 increases. Once it reaches a voltage Vcf that forward biases diode D2 832, the energy of the spike is regenerated to VOUT 804 through bidirectional TVS diode D1 831 and Diode D2 832, and acts to charge output filter capacitor C2 822. Only a small portion of the energy of the spike is dissipated in bidirectional TVS diode D1 831. This effectively clamps the voltage spike to a level equal to the voltage output (VOUT) plus the clamping voltage, Vc, of bidirectional TVS diode D1 831 and the diode drop of diode D2 832.

Since TVS diode D1 831 is bidirectional, only a small portion of the energy stored in the snubber capacitor C1 821 will be discharged when switch Q1 841 is on. The residual voltage, Vcr, on the snubber capacitor depends on either the voltage clamping rating of bidirectional TVS diode D1 831 or the voltage output node VOUT where the cathode of snubber diode D2 832 is coupled. In some example embodiments of the present invention, the cathode of snubber diode D2 832 may be coupled to other voltage sources, such as an internal bias node, such that the low loss snubber circuit is configured to regenerate energy from a voltage spike to an internal bias node.

In some example embodiments of the present invention, large snubber capacitors C1 821 may be used to effectively clamp large dv/dt voltage spikes without increasing the switch loss by including bidirectional TVS diode D1 831. Thus, it operates similar to an active clamp circuit as snubber capacitor C1 821 does not completely discharge.

As discussed above, embodiments of the present invention regenerate some of the energy of the voltage spike. This reduces power loss of the snubber circuit and improves the efficiency of the power converter.

Since snubber capacitor C1 821 does not completely discharge, it allows the use of much a lower clamping voltage rated bidirectional TVS diode D1 831, as long as its standoff voltage is larger than the winding voltage of secondary coil S1 of transformer TX1 861. This reduces the power dissipation on bidirectional TVS diode D1 831 and increases the robustness of bidirectional TVS diode D1 831, since a lower clamping voltage allows for higher clamping currents for a given power rating of the bidirectional TVS diode D1 831. Example embodiments of the present invention may be used both in hard-switching switches and in resonant converters.

Switching cycle snubbering is possible as the response of snubber 812 is very fast. However, in example embodiments it is preferred that bidirectional TVS diode D1 831 is selected such that it only starts to respond and clamp at the moment when switch Q1 841 is exceeding its derating target. In this manner, power loss is further reduced as it may not need to respond every switching cycle.

FIG. 9 illustrates an exemplary current 902-voltage 904 curve 900 for a bidirectional TVS diode. FIG. 9 clearly illustrates the bidirectional properties of an exemplary TVS diode for use within a low loss snubber circuit.

FIG. 10 illustrates exemplary bidirectional TVS diodes for use within a low loss snubber circuit. In some embodiments of the present invention, a bidirectional TVS diode 1000 may comprise two unidirectional TVS diodes, such as the two unidirectional TVS diodes 1002 and 1004 connected in a common cathode configuration, or the two unidirectional TVS diodes 1006 and 1008 connected in a common anode configuration.

Figure 11:
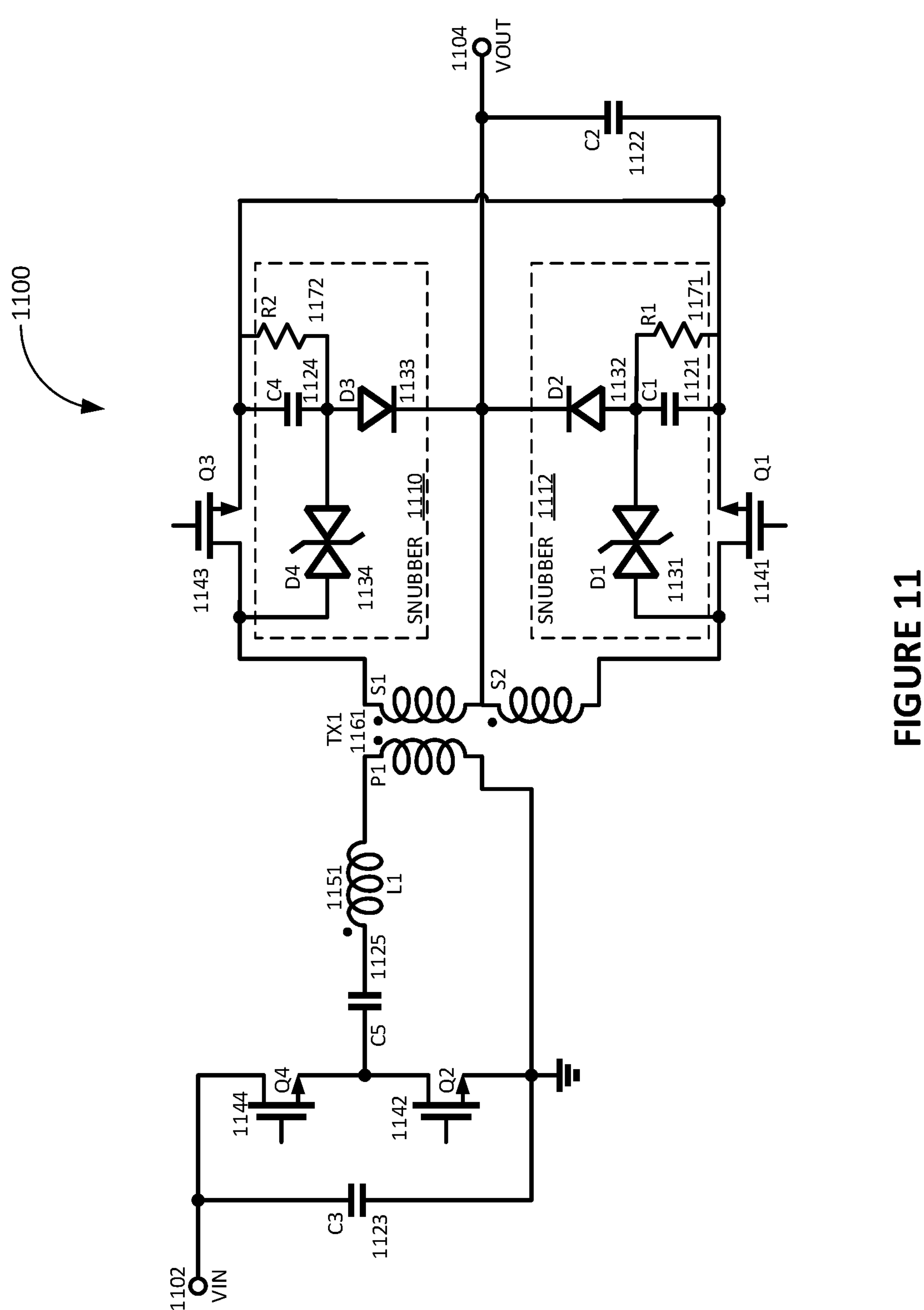
FIG. 11 illustrates a power converter including two low loss snubber circuits including discharge resistors.

FIG. 11 illustrates an LLC resonant power converter 1100 including two low loss snubber circuits 1110 and 1112 including discharge resistors. As illustrated in FIG. 11, LLC resonant power converter 1100 receives an input voltage VIN at node 1102 and provides an output voltage VOUT at node 1104. LLC resonant power converter 1100 includes input capacitor C3 1123, switches Q2 1142 and Q4 1144, resonant capacitor C5 1125, and resonant inductor L1 1151 which feeds into transformer TX1 1161. Transformer TX1 includes one primary coil and two secondary coils. LLC resonant power converter 1100 also includes output filtering capacitor C2 1122.

Snubber circuit 1110 is configured to protect switch Q3 1143, while snubber circuit 1112 is configured to protect switch Q1 1141.

Each low loss snubber circuit includes a bidirectional transient voltage suppression (TVS) diode, a diode, and a capacitor. Snubber 1110 includes bidirectional TVS diode D4 1134, snubber diode D3 1133, snubber capacitor C4 1124, and snubber resistor R2 1172 connected in parallel to snubber capacitor C4 1124, while snubber 1112 includes bidirectional TVS diode D1 1131, snubber diode D2 1132, snubber capacitor C1 1121, and snubber resistor R1 1171 connected in parallel to snubber capacitor C1 1121.

In some embodiments, snubber diodes D2 1132 and D3 1133 may be ultra-fast recovery diodes, or the like, suitable for snubbering applications. Snubber capacitors C1 1121 and C4 1124 are preferably high-frequency capacitors, such as ceramic capacitors or film capacitors.

In snubber 1112, bidirectional TVS diode D1 1131 and snubber capacitor C1 1121 form a high-frequency path, and are located close to the device (switch Q1 1141) that needs protection. Snubber diode D2 1132 is coupled to a circuit node or voltage output where the energy absorbed by the snubber may be regenerated. Snubber 1110 performs in the same manner.

During operation of LLC resonant power converter 1100, voltage spikes with high dv/dt may appear across switch Q1 1141. These spikes may be caused by coupling from a lightning surge, or by the resonance between the output capacitance of switch Q1 1141 and the leakage inductance of secondary coil S2 of transformer TX1 1161 when switch Q1 1141 is turned off.

When large voltage spikes occur on the drain of switch Q1 1141, at the leading edge of the spike, once the voltage is greater than the clamping voltage, Vc, of TVS diode D1 1131 plus the residual voltage, Vcr, of capacitor C1 1121, bidirectional TVS diode D1 1131 responds within picoseconds to clamp the voltage. The voltage spike is clamped by bidirectional TVS diode D1 1131 and charges capacitor C1 1121.

As capacitor C1 1121 is charged, voltage across capacitor C1 1121 increases. Once it reaches a voltage Vcf that forward biases diode D2 1132, the energy of the spike is regenerated to VOUT 1104 through bidirectional TVS diode D1 1131 and diode D2 1132, and acts to charge output filter capacitor C2 1122. Only a small portion of the energy of the spike is dissipated in bidirectional TVS diode D1 1131. This effectively clamps the voltage spike to a level equal to the voltage output plus the clamping voltage, Vc, of bidirectional TVS diode D1 1131 and the diode drop of diode D2 1132.

Since TVS diode D1 1131 is bidirectional, without snubber resistor R1 1171, only a small portion of the energy stored in the snubber capacitor C1 1121 would be discharged when switch Q1 141 is on. Without snubber resistor R1 1171, the residual voltage, Vcr, on the snubber capacitor depends on either the voltage clamping rating of bidirectional TVS diode D1 1131 or the voltage output node VOUT where the cathode of snubber diode D2 1132 is coupled. In some example embodiments of the present invention, the cathode of snubber diode D2 1132 may be coupled to other voltage sources, such as an internal bias node, such that the low loss snubber circuit is configured to regenerate energy from a voltage spike to an internal bias node.

By adding snubber resistor R1 1171 to snubber 1112, the residual voltage, Vcr, on the snubber capacitor may be reduced such that bidirectional TVS diode D1 1131 is able to respond earlier at a lower point on the leading edge of the voltage spike.

Snubber resistor R1 1171 further discharges the residual voltage, Vcr, on snubber capacitor C1 1121. Although there is a small amount of power dissipation from snubber resistor R1 1171, the addition of snubber resistor R1 1171 improves the clamping performance and results in lower voltage stress for switch Q1 1141 because Vcr on capacitor C1 1121 is lower and bidirectional TVS diode D1 1131 is able to respond earlier at a lower point on the leading edge of the voltage spike. The time constant of snubber capacitor C1 1121 and snubber resistor R1 1171 is not critical since voltage across snubber capacitor C1 112 is still limited to where snubber diode D2 1132 is connected plus the diode drop of snubber diode D2 1132. Switching cycle snubbering is still possible even with large resistance values for snubber resistor R1 1171.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A low loss snubber circuit for protecting an electronic device within a power converter comprising:
- a bidirectional transient voltage suppression (TVS) diode having first and second nodes, wherein the first node of the bidirectional TVS diode is coupled to a drain terminal of the electronic device;
- a snubber capacitor having first and second nodes, wherein the first node is coupled to the second node of the bidirectional TVS diode and the second node is coupled to a source terminal of the electronic device;
- a snubber diode having an anode and a cathode, wherein the anode is coupled to the second node of the bidirectional TVS diode and the cathode is coupled to a node of the power converter; and
- a transformer comprising a primary coil and a secondary coil;
- wherein the secondary coil is coupled, at a first end, to the drain terminal of the electronic device; and
- wherein the secondary coil is coupled, at a second end, to the node of the power converter.

2. The low loss snubber circuit of claim 1, wherein the bidirectional TVS diode comprises two unidirectional TVS diodes connected in a common cathode configuration.

3. The low loss snubber circuit of claim 1, wherein the bidirectional TVS diode comprises two unidirectional TVS diodes connected in a common anode configuration.

4. The low loss snubber circuit of claim 1, further comprising:
- a snubber resistor coupled in parallel with the snubber capacitor.

5. The low loss snubber circuit of claim 1, configured to regenerate energy from a voltage spike to an output of the power converter when the snubber diode is forward biased due to the voltage spike.

6. The low loss snubber circuit of claim 1, configured to provide snubbering during each switching cycle of the power converter.

7. The low loss snubber circuit of claim 1, wherein the electronic device is a switch or rectifier.

8. The low loss snubber circuit of claim 1, wherein the power converter is an LLC resonant power converter.

9. The low loss snubber circuit of claim 1, wherein the cathode of the snubber diode is coupled to an output node of the power converter.

10. The power converter of claim 1, wherein the electronic device comprises an N-channel metal-oxide semiconductor field-effect transistor (MOSFET).

11. A power converter comprising:
- an electronic device susceptible to voltage spikes; and
- a low loss snubber circuit configured to protect the electronic device from voltage spikes, the low loss snubber circuit comprising:
  - a bidirectional transient voltage suppression (TVS) diode having first and second nodes, wherein the first node of the bidirectional TVS diode is coupled to a drain terminal of the electronic device;
  - a snubber capacitor having first and second nodes, wherein the first node is coupled to the second node of the bidirectional TVS diode and the second node is coupled to a source terminal of the electronic device;
  - a snubber diode having an anode and a cathode, wherein the anode is coupled to the second node of the bidirectional TVS diode and the cathode is coupled to a node of the power converter; and
  - a transformer comprising a primary coil and a secondary coil;
  - wherein the secondary coil is coupled, at a first end, to the drain terminal of the electronic device; and
  - wherein the secondary coil is coupled, at a second end, to the cathode of the snubber diode.

12. The power converter of claim 11, wherein the bidirectional TVS diode comprises two unidirectional TVS diodes connected in a common cathode configuration.

13. The power converter of claim 11, wherein the bidirectional TVS diode comprises two unidirectional TVS diodes connected in a common anode configuration.

14. The power converter of claim 11, wherein the low loss snubber circuit further comprises:

a snubber resistor coupled in parallel with the snubber capacitor.

15. The power converter of claim 11, wherein the low loss snubber circuit is configured to regenerate energy from a voltage spike to an output of the power converter when the snubber diode is forward biased due to the voltage spike.

16. The power converter of claim 11, wherein the low loss snubber circuit is configured to provide snubbering during each switching cycle of the power converter.

17. The power converter of claim 11, wherein the electronic device is a switch or rectifier.

18. The power converter of claim 11, wherein the power converter is an LLC resonant power converter.

19. The power converter of claim 11, wherein the cathode of the snubber diode is coupled to an output node of the power converter.

20. The power converter of claim 11, wherein the electronic device comprises an N-channel metal-oxide-semiconductor field-effect transistor (MOSFET).

* * * * *